United States Patent [19]
Dolby et al.

[11] Patent Number: 6,038,231
[45] Date of Patent: Mar. 14, 2000

[54] DATA SUPPRESSION AND REGENERATION

[75] Inventors: Riki Benjamin Dolby, Hertfordshire; Gyles Harvey, Harlow; Nigel Phillip Jenkins, Harlow; Rajakulasingam Raviraj, Harlow, all of United Kingdom

[73] Assignee: Northern Telecom Limited, Montreal, Canada

[21] Appl. No.: 08/896,380

[22] Filed: Jul. 18, 1997

[30] Foreign Application Priority Data

May 2, 1997 [GB] United Kingdom ................. 97091102

[51] Int. Cl.[7] ............................. H04L 12/28; H04J 3/24
[52] U.S. Cl. ......................... 370/394; 370/474; 370/477
[58] Field of Search ................... 370/394, 477, 370/521, 395, 474, 242, 473

[56] References Cited

U.S. PATENT DOCUMENTS

| | | | |
|---|---|---|---|
| 5,020,058 | 5/1991 | Holden et al. | |
| 5,535,200 | 7/1996 | Gardner . | |
| 5,555,244 | 9/1996 | Gupta et al. | |
| 5,600,316 | 2/1997 | Moll . | |
| 5,610,595 | 3/1997 | Garrabrant et al. | 370/394 |
| 5,657,316 | 8/1997 | Nakagaki et al. | 370/394 |
| 5,715,238 | 2/1998 | Hall, Jr. et al. | 370/242 |
| 5,802,050 | 9/1998 | Petersen et al. | 370/394 |
| 5,878,041 | 3/1999 | Yamanaka et al. | 370/394 |

FOREIGN PATENT DOCUMENTS

| | | |
|---|---|---|
| 0 756 267 A1 | 1/1997 | European Pat. Off. . |
| 06164629 | 6/1994 | Japan . |

OTHER PUBLICATIONS

T Oda et al: 1989 Autumn National Convention Record IEICE, vol. b173, No. 3, Sep. 12, 1989, p. 22 XP002081019.

Magellan Business Networks Product Bulletin, Jan. 1996 Passport's Repetitive Cell Suppression offers additional bandwidth efficiency for Video and PBX signalling channels in 1Q96.

*Primary Examiner*—Chau Nguyen
*Assistant Examiner*—Phuongchau Ba Nguyen
*Attorney, Agent, or Firm*—Lee, Mann, Smith, McWilliams, Sweeney & Ohlson

[57] ABSTRACT

A method of reducing bandwidth used on a telecommunications link comprising, at an input to the link, the steps of: receiving a plurality of data packets, each packet comprising data and a packet identifier; determining packets which contain redundant data; transmitting, across the link, packets which do not contain redundant data; and further comprising, at an output of the telecommunications link, the steps of: receiving the transmitted packets; determining missing packets according to the identifiers of received packets; and generating data for the missing packets, which generated data corresponds to redundant data not transmitted across the link. This ensures bit count integrity between the input and the output of the link. Redundant data may be data following a predictable pattern, such as identical data. Where the packet identifiers are a recurring sequence of N symbols, the input transmits at least one packet in every N packets.

19 Claims, 11 Drawing Sheets

Match = All bytes in payload are identical
Previous Match = Previous cell had all bytes in payload identical
Payload Match = New cells payload matches the payload of the previous cell

DATA SUPPRESSION AND REGENERATION

TECHNICAL FIELD

This invention relates to a method of reducing bandwidth used on a telecommunications link, a method of operating an output of a telecommunications link on which bandwidth is being reduced, and to apparatus for performing these methods.

BACKGROUND OF THE INVENTION

Packet, cell and frame-based transport protocols are increasingly being used in telecommunications networks. In particular, Asynchronous Transfer Mode (ATM) technology is a flexible form of transmission which allows various types of service traffic, such as voice, video or data, to be multiplexed together on to a common means of transmission, the traffic being carried in cells each having a payload and a header indicating the destination of the cell. ATM statistically multiplexes traffic and removes the rigid relationship between traffic and the time-domain which exists in other multiplexing protocols. ATM can accommodate both traffic whose information rate is constant during a call, and traffic whose information rate varies during a call. Operators are investing in ATM transmission equipment to accommodate users' increasingly diverse communications requirements.

In order to minimise costs, a network operator wants to use his transmission network most efficiently. One way of achieving efficiency is to make the best use of the bandwidth of the network.

One known way of reducing the amount of bandwidth which a telephone call uses on a transmission network is to suppress the periods of silence which occur during a telephone conversation. Silence suppression detects silence at an input to a transmission network, does not send data representing silence across the network, and at an output of the network inserts 'comfort noise' in place of the removed silence. The bandwidth that is saved by not transmitting the silent periods of a call allows other traffic such as bursty data traffic to be transported across the network. This sharing of the network is particularly easy to achieve in a cell-based network.

A technique for saving bandwidth on a cell-based transmission network is used in Northern Telecom's PASSPORT™ switch. The PASSPORT™ switch looks for consecutive identical cells representing an idle channel condition. When enough identical cells are received, the switch stops transmitting cells onto the network. At the destination the PASSPORT™ switch continues to transmit the last cell that it received, thereby saving bandwidth on the network. In this scheme the data which is suppressed at the input to the network is not regenerated accurately at the output of the network.

The present invention seeks to provide an alternative method of saving bandwidth.

SUMMARY OF THE INVENTION

According to one aspect of the present invention, there is provided a method of reducing bandwidth used on a telecommunications link comprising, at an input to the link, the steps of:

receiving a plurality of data packets, each packet comprising data and a packet identifier;

determining packets which contain redundant data;

transmitting, across the link, packets which do not contain redundant data;

and further comprising, at an output of the telecommunications link, the steps of:

receiving the transmitted packets;

determining missing packets according to the identifiers of received packets; and, generating data for the missing packets, which generated data corresponds to redundant data not transmitted across the link.

By not transmitting redundant data the packets use a reduced bandwidth of the telecommunications link.

The step of determining missing packets according to their identifiers allows redundant data to be regenerated more accurately at the output of the link. The output of the link is able to determine how many packets were suppressed at the input to the link, thus maintaining bit count integrity between the data arriving at the input of the link and the data flowing out of the output of the link.

The regenerated data may be placed in packets for onward transmission across a further telecommunications link. Alternatively, it may be simply be regenerated, such as where the regeneration is performed at the interface between a packet-based network and a non-packet network.

Preferably the step of determining packets which contain redundant data comprises identifying a sequence of consecutive packets containing data that follows a predictable pattern and transmitting only the first packet or packets in the sequence. In many cases it should be possible to transmit only the first packet in the identified sequence, thereby maximising bandwidth savings, but in some cases it is necessary to transmit the first few packets in the identified sequence so that the output can correctly identify that data needs to be regenerated. In its simplest form the input identifies a sequence of packets containing the same data. Each packet may comprise a plurality of identical units, such as an idle data flag, an alarm flag, or a group of data bytes. Rotated versions of the flags may be identified, the rotation being caused by the flags not being aligned exactly with the bytes of the packet payload. Another pattern which may be identified is a ramp in data values.

In situations where only a portion of each packet contains user data, it is advantageous that the step of determining packets which contain redundant data examines only the portion of the packet containing user data. This allows the technique to work with partially-filled cells, such as are used in delay-sensitive applications.

Preferably the packet identifiers of a sequence of packets are a sequence of symbols and the step of determining missing packets according to the identifiers of received packets comprises identifying missing symbols in the sequence of identifiers of received packets. Consecutive packets in a sequence have different identifier values, and the identifier values of a sequence of packets are preferably an incremental sequence. The packet identifier is preferably a number, but it may alternatively be some other symbol. The sequence of identifier values should be known by the output of the link so that the output can correctly identify missing packets which have been suppressed by the input.

The packet identifiers of a sequence of packets may be a recurring sequence of N symbols. In this case the input transmits at least one packet in every N packets such that the output can determine the exact number of missing packets. This ensures bit count integrity between the input to the link and the output of the link. One example of a protocol in which the packet identifiers of a sequence of packets are a recurring sequence of N symbols is the ATM AAL1 protocol. In the ATM AAL1 protocol the identifier values of a sequence of consecutive packets are the recurring set of sequence numbers 0,1,2,3,4,5,6,7.

Preferably data for the missing packets is generated according to data carried in other packets received at the output. The data for the missing packets is generated according to data carried in received packets preceding the missing packets, and in its simplest form replicates data carried in received packets preceding the missing packets.

Preferably data is generated for a missing packet only if the missing packet follows one or more packets whose pattern of data indicates that the missing packet may not have been transmitted across the link. This has the advantage of avoiding errors caused by regenerating a packet which was not purposely suppressed at input, but lost by the transmission network. The packet preceding the missing packet may have a payload of data comprising a plurality of identical units, such as a sequence of idle flags; or a repeating pattern of n data bytes. Alternatively, the missing packet may be preceded by two cells having identical payloads.

The output may store data patterns such as commonly occurring flags or byte patterns, for use in matching with received data. Updated pattern information, for use in pattern matching, may be sent to the output by the input or by a network management unit via a management communications channel.

Another aspect of the invention provides a method of operating an output of a telecommunications link on which bandwidth is being minimised by not transmitting packets containing redundant data comprising the steps of:

receiving a plurality of data packets, each packet comprising data and a packet identifier;

determining missing packets according to the identifiers of received packets; and, generating data for the missing packets, which generated data corresponds to the redundant data not transmitted across the link.

A further aspect of the invention provides apparatus for minimising bandwidth used on a telecommunications link comprising, at an input to the link:

means for receiving a plurality of data packets, each packet comprising data and a packet identifier;

means for determining packets which contain redundant data;

means for transmitting, across the link, only the packets which do not contain redundant data;

and further comprising, at an output of the communications link:

means for receiving the transmitted packets;

means for determining missing packets according to the identifiers of received packets; and, means for generating data for the missing packets, which generated data corresponds to the redundant data not transmitted across the link.

A still further aspect of the invention provides apparatus for use at an output of a telecommunications link on which bandwidth is being minimised by not transmitting packets containing redundant data comprising:

means for receiving a plurality of data packets, each packet comprising data and a packet identifier;

means for determining missing packets according to the identifiers of received packets; and, means for generating data for the missing packets, which generated data corresponds to the redundant data not transmitted across the link.

The following detailed description describes the bandwidth-saving feature with reference to an ATM network carrying constant bit rate services. However, the invention has more general application to other packet, cell or frame-based transport mechanisms such as Switched Multimegabit Data Service (SMDS) or Connectionless Broadband Data Service (CBDS). While there is more opportunity for bandwidth-saving with packets carrying constant bit rate traffic, the bandwidth-saving feature is not limited to being used with packets carrying constant bit rate traffic, but can also be used with packets carrying variable bit rate traffic.

The packets, cells or frames may be full of user data or they may be only partially filled, such that part of a packet contains user data and the remainder of the packet contains padding data. Partial filling is a technique which is often used in delay-sensitive applications where it is undesirable to wait to fill an entire packet with user data.

Preferred features may be combined as appropriate, and may be combined with any of the aspects of the invention as would be apparent to a person skilled in the art.

BRIEF DESCRIPTION OF THE DRAWINGS

For a better understanding of the invention, and to show by way of example how the invention may be carried into effect, embodiments of the invention will now be described with reference to the accompanying drawings in which.

DESCRIPTION OF PREFERRED EMBODIMENTS

Figure 1:
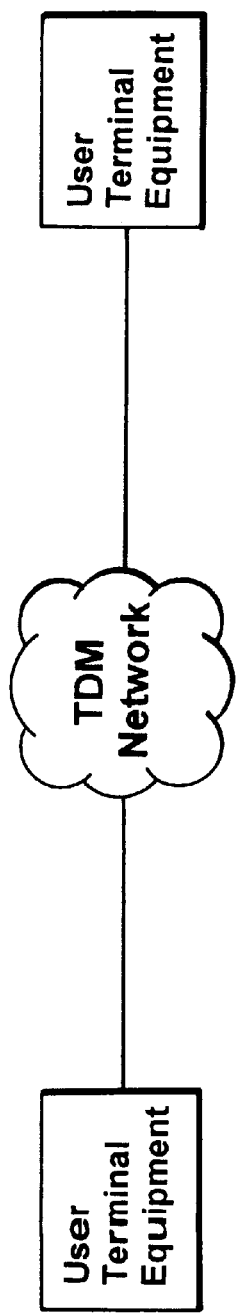
FIG. 1 shows terminal equipments which are interconnected by a conventional time-division multiplexed network.

Many telecommunications customers require information to be transported at a well-defined, constant bit rate (CBR). Real-time voice is an example of a constant bit rate service. To meet this demand traditional circuit-switched networks have evolved by assigning bandwidth in multiples of 64 Kbit/s regardless of whether this bandwidth is required for the entire duration of a call. Many such services in use today have been explicitly designed to use existing transport mechanisms which can transfer information in multiples of 64 kbit/s. Such services are often called N×64 kbit/s services and usually comprise some form of time-division multiplexed (TDM) transmission network, as shown in FIG. 1.

Figure 2:
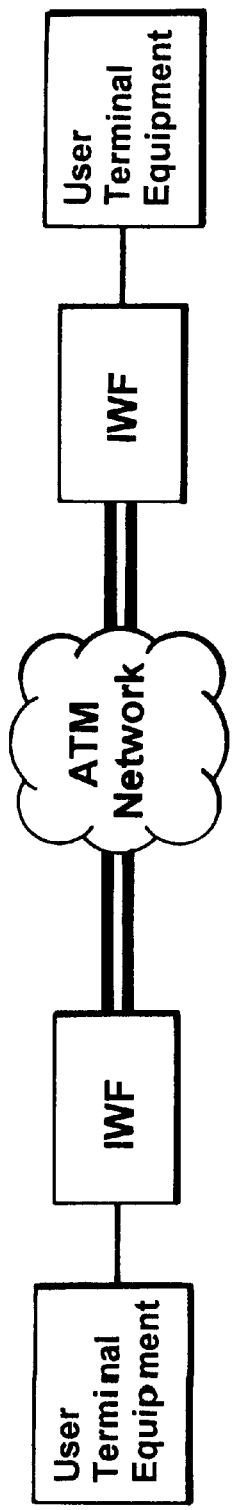
FIG. 2 shows terminal equipments which are interconnected by an ATM network.

However, as far as the customer is concerned, as long as information is provided at a constant rate at one end of the connection, and it arrives at the same rate at the other end of the connection, the transport mechanism across the network is of little or no concern. With the advent of ATM technology, there is now a demand for interoperability between ATM and customer's existing TDM equipment. To meet this demand it must be possible to carry the CBR over the ATM network, emulating the required circuit characteristics appropriately. Some form of conversion of the N×64 kbit/s information must take place before it can be transferred as ATM cells across an ATM network. This conversion is performed by an ATM Interworking Function (IWF) as shown in FIG. 2.

Figure 3:
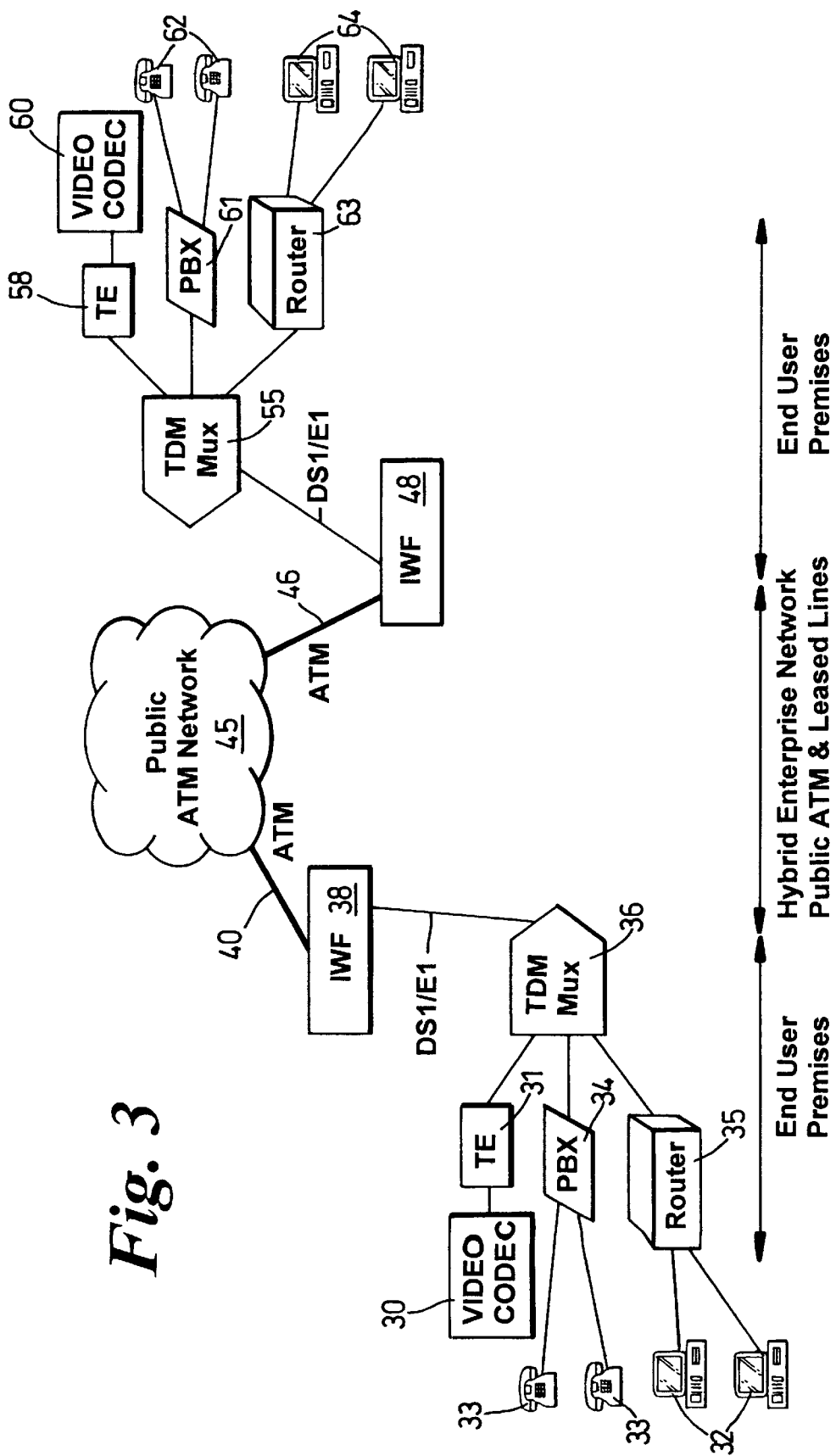
FIG. 3 shows an example of a telecommunications network in which the invention may be used.

FIG. 3 shows a communications network having a number of communications sources (video codec 30, PBX 34, Router 35) connected to similar devices 60, 61, 63 via a combination of a time-division multiplexed network and an ATM network 40, 45, 46.

A TDM Multiplexer 36 receives inputs from terminal equipment 31, PBX 34 and router 35. Each input comprises a data signal which is a multiple of 64 kbit/s. Multiplexer 36 multiplexes the inputs into a time division multiplexed output data stream, such as a Plesiochronous Digital Hierarchy (PDH) DS1 or E1 link. An interworking unit IWF 38 receives the data from the DS1/E1 links and packages it into a form for transmission over ATM network 40, 45, 46 to a further inter-working unit IWF 48. IWF 48 converts the ATM packaged data to a form for onward transmission over a further DS1/E1 link to a further multiplexer 55. Mux 55 demultiplexes the data for transmitting to equipment 58, 61, 63.

As indicated on FIG. 3, equipments 30–36 may be sited at a customer's premises, and the ATM network may be part of a public network.

Referring again to FIG. 3, each input to Mux 36 must be a multiple of 64 kbit/s. However, some sources generate a data stream which varies in bit rate. As an example, video codec 30 generates data at a variable rate according to the activity and detail in a video picture. Codec 30 connects to Mux 36 via a terminal equipment 31 which receives the variable bit rate data stream from codec 30 and generates a constant n×64 kbit/s output. TE 31 achieves this by inserting idle flags into the data stream during idle periods. In a protocol called High Data Link Control (HDLC) an idle flag is represented by the byte '01111110'. Idle periods may vary in length from being very short, such as where a video codec generates data at 30 kbit/s but must be padded out to 64 kbit/s, or very long, such as where a video conference has ended and codecs have been turned off but the connection has not been terminated.

Another condition which can occur is that a piece of terminal equipment, such as a telephone 33 generates an alarm signal, represented by a continuous stream of binary ones '11111 . . . '.

Figure 4:
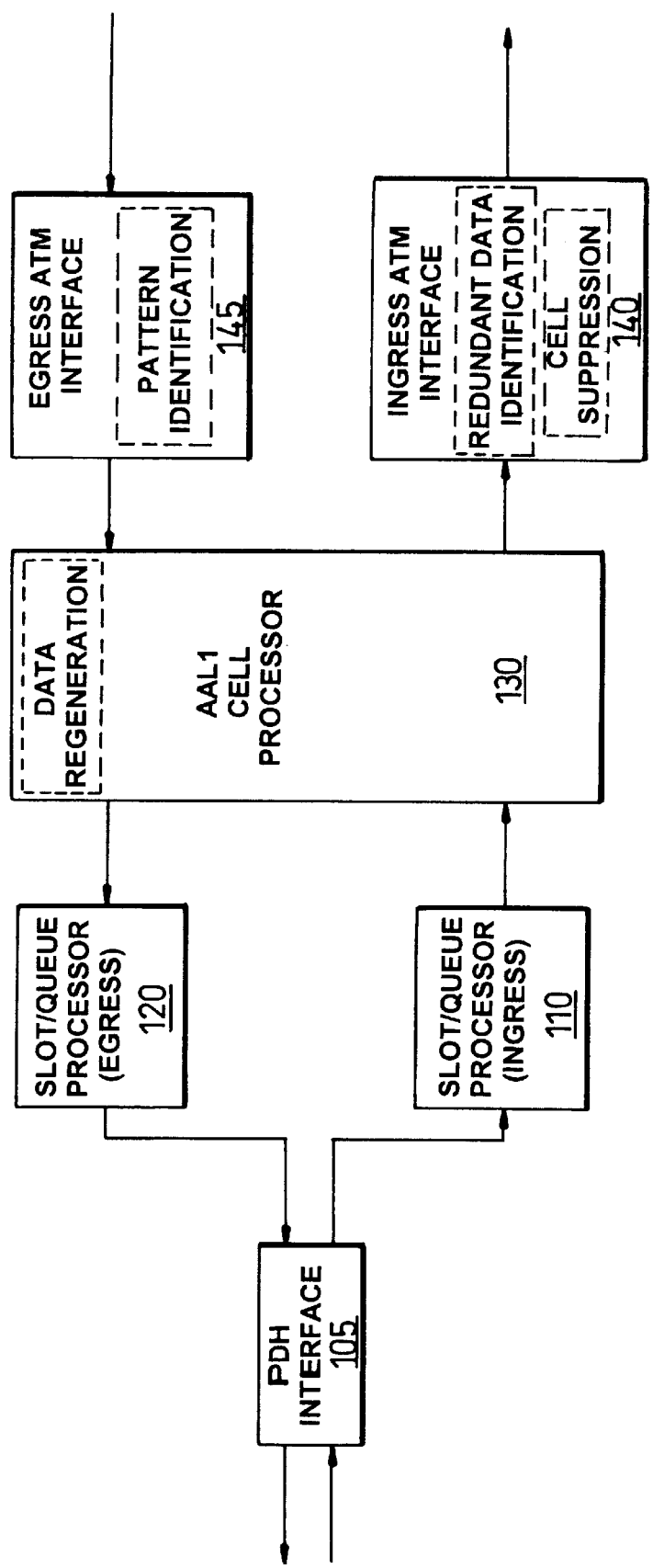
FIG. 4 shows the interworking part (IWF) of FIG. 3 in more detail.

The operation of the TDM/ATM interworking units IWF will now be described in more detail, with reference to FIG. 4.

The interworking unit enables users of PDH terminal equipment and services to operate over an ATM network, obtaining a Quality of Service (QoS) comparable with that offered by PDH-based networks. This enables network operators to migrate to a broadband ATM network whilst continuing to offer support for existing PDH terminal equipment. PDH data is transported via the ATM Adaptation Layer (AAL) type-1. This service is tailored to continuous bit rate (CBR) services, known as class A, because it receives and delivers Protocol Data Units (PDUs) with the same constant bit rate to or from the next higher protocol layer.

Two transfer modes are available: unstructured mode and structured mode.

In unstructured mode an entire PDH bit stream, including the frame overhead bit(s), is conveyed point-to-point across the ATM network without interpretation using ATM Adaptation Layer type-1 (AAL1) cells sharing a single virtual channel across the ATM network. The complete PDH bit stream is inserted into the SAR-PDU payload of AAL1 cells without regard to ATM-PDH octet alignment.

In structured mode, the ATM network bandwidth demands can be reduced as the data from selected PDH time slots, corresponding to particular N×64 kb/sec services, is transported from the incoming PDH frames across the ATM network. Each N×64 kb/sec service uses a separate virtual channel across the ATM network. Data from particular PDH time slots is inserted into the SAR-PDU payload of AAL1 cells.

The interworking unit is shown with one DS1 or E1 Plesiochronous Digital Hierarchy (PDH) interface 105 coupled to a single ATM Adaptation Layer type-1 (AAL1) processing function within the AAL1 Processing module 130. The AAL1 Processing module is connected to separate ingress and egress ATM cell interfaces 140, 145.

PDH data received from each PDH interface is optionally framed and passed to the timeslot and queue function. In this function the incoming data bytes are assigned to channel queues according to their port and timeslot. If Channel Associated Signalling (CAS) mode is selected for a particular channel, signalling bytes are also assigned to the channel queues. The data and signalling are queued so as to generate the AAL1 data structure according to the mode of transmission selected. Once sufficient data as been queued, the data structure is passed to the AAL1 processing function. The amount of data may be a full cell payload or a partial cell payload depending on whether partial filling is being used. When a PDH service interface is operating in unstructured mode, all the receive data is placed directly in a single virtual channel queue.

The AAL1 processor 130 may add a pointer field to the data structure while generating AAL1 Segmentation and Reassembly Protocol Data Units (SAR-PDUs) which are then placed within cells, together with control and optional timing information. A separate Virtual Path Identifier (VPI)/Virtual Channel Identifier (VCI) in the ATM cell header is used for cells of each service. The cells from each AAL1 processing function are then passed to an ingress ATM cell interface 140 where the ingress part of the bandwidth-saving feature is performed by a redundant data identification block and a cell suppression block. ATM cells are then queued for transmission over the ATM network.

At a destination, or egress ATM cell interface 145, a pattern identification block identifies cells containing data having a predetermined pattern, and marks these cells. The cells are then routed to an AAL1 processing function, via an internal cell demultiplexer, in accordance with the VCI/VPI labels contained in their ATM cell headers. The SAR-PDU is extracted and the recovered PDH data is placed within a 'play-back', or reassembly buffer which is read at a rate determined by either an external clock reference, or timing information recovered from the Protocol Control Information (PCI) held within the SAR-PDU header. A data regeneration block identifies cells which have been suppressed and regenerates data.

Figure 5:
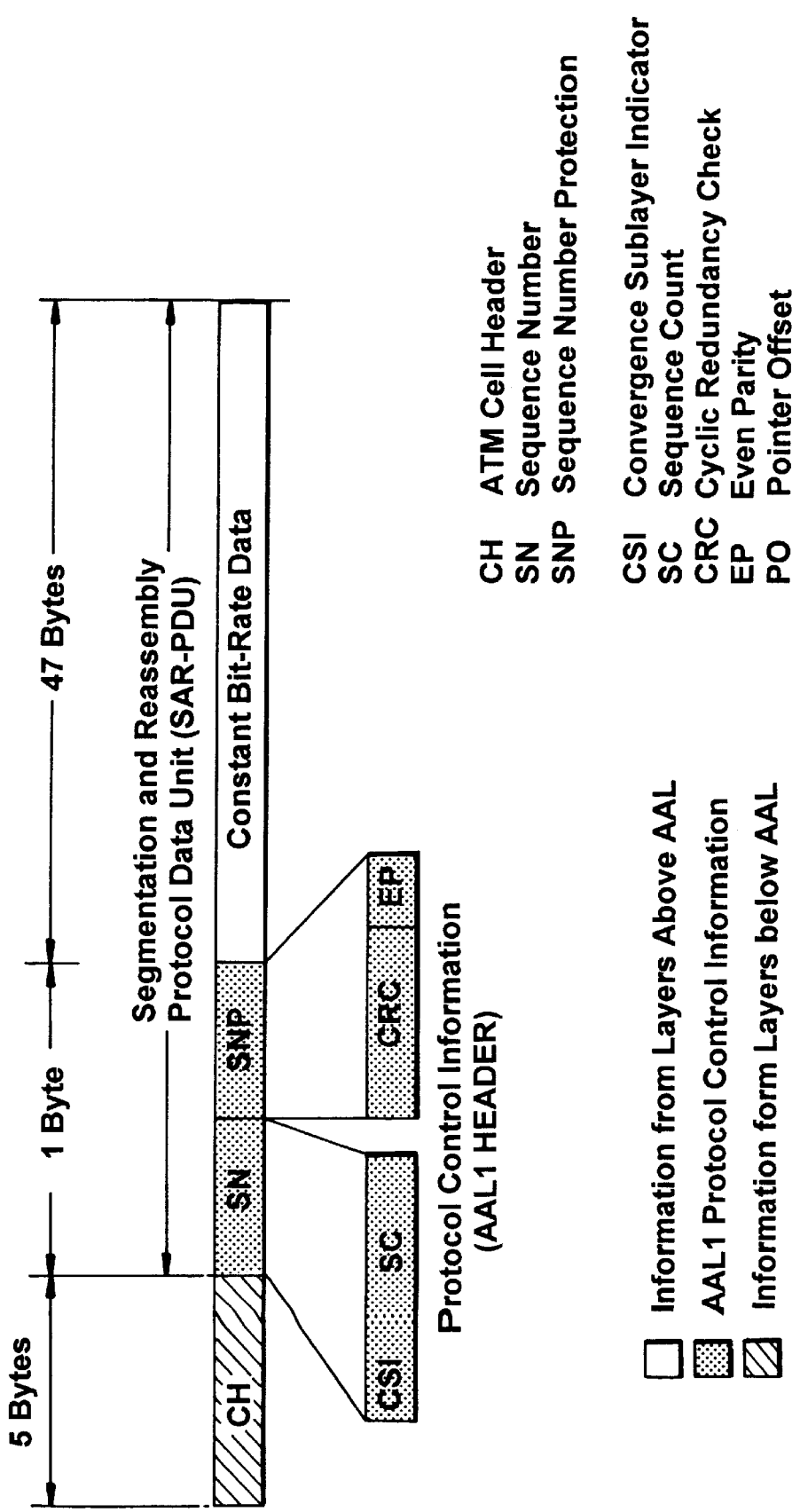
FIG. 5 shows the format of cells which can be transmitted over the network of FIG. 3.

FIG. 5 shows the structure of cells used in one format of AAL1 transmission. ATM cells are 53 bytes long with a 5 byte ATM cell header and a 48 byte payload. The ATM cell header CH includes information which determines the routing of the cell through the ATM network, i.e. the virtual channel. The payload portion of the AAL1 cell comprises 46 or 47 bytes of constant bit-rate data (depending on the AAL1 format used) and a 1 or 2 byte AAL1 header. The AAL1 header includes a sequence number SN and protection for the sequence number SNP. Within the sequence number block SN there is a sequence count SC which contains a value of 0, 1, 2, 3, 4, 5, 6 or 7. For a particular virtual channel, consecutive cells in time have consecutive sequence numbers. Consecutive cells have the sequence numbers 0, 1, 2, 3, 4, 5, 6, 7, 0, 1, 2 . . . i.e. the sequence number repeats after every 8 cells. The count of sequence numbers for each virtual channel across the ATM network is independent of the count used on other virtual channels.

Figure 6:
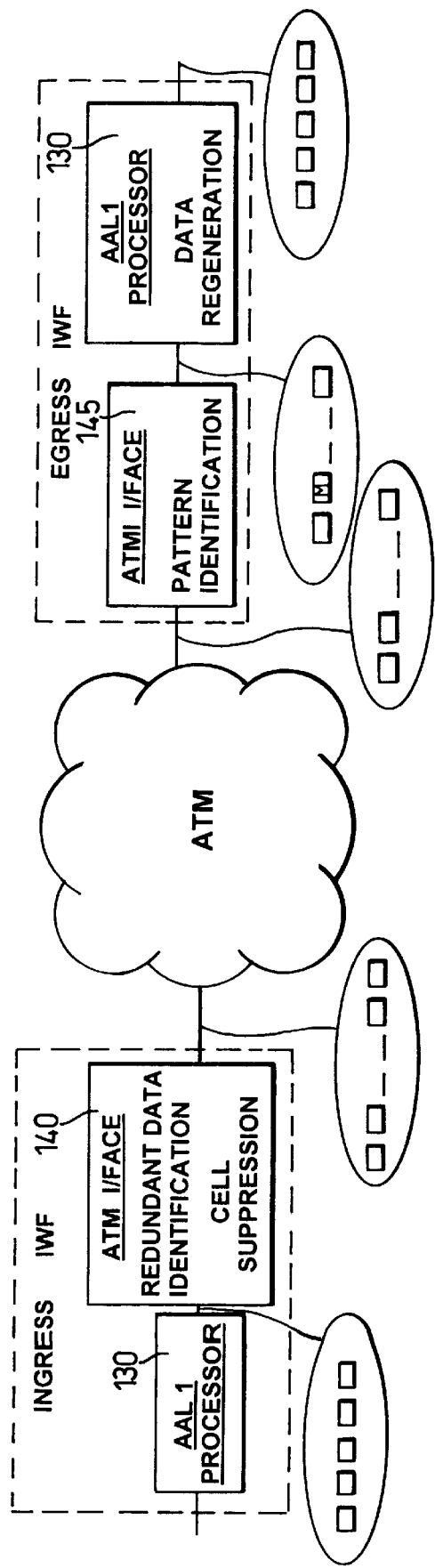
FIG. 6 is an overview of the bandwidth-saving feature.

FIG. 6 gives an overview of the process for saving bandwidth in the ATM network. The effect of the bandwidth-saving process on a small group of cells is shown at various points in the system.

At the ingress, incoming data is packaged into cells by AAL1 processor 130, resulting in a stream of cells. Ingress ATM cell interface 140 identifies cells which contain redundant data, and suppresses them i.e. does not transmit them. This reduced group of cells is transmitted across the ATM network. At the egress of the ATM network the cells are received. ATM interface 145 identifies cells which contain data having a particular pattern, such as cells containing a string of idle flags. These cells are marked (M). Missing cells are identified by examining the sequence numbers of received cells. Cells which were suppressed by the ingress ATM cell interface 140 are regenerated by the egress AAL1 cell processor 130. Cells are only regenerated when they are preceded by a marked cell, to avoid errors caused by regenerating data for cells which are missing due to reasons other than being suppressed at the ingress.

The egress IWF therefore outputs the same number of bits as were originally input at the ingress, these bits having exactly the same content as those originally input at the ingress. By suppressing cells at the ingress to the ATM network bandwidth is made available on the ATM network for other traffic.

Examples of redundant data are:

cells containing the same pattern of data bits or bytes;

cells containing idle flags, where a source has become idle, but is transmitting idle flags to maintain a constant bit rate;

cells containing alarm flags, where a source has a fault and transmits a stream of alarm flags.

The suppression method works by identifying one or more cells which contain a payload of data that follows a predetermined or predictable pattern. The embodiment described here in detail identifies consecutive cells having identical payloads. The first of the cells which contain the same data is sent and the subsequent matching cells are suppressed. At the egress, suppressed cells are identified by checking the sequence number of each received cell. A cell which has been suppressed at the ingress results in a missing cell sequence number in the stream of cells received at the egress. Data for a suppressed cell is regenerated by copying the payload content of a received cell which preceded the missing cell.

Figure 7:
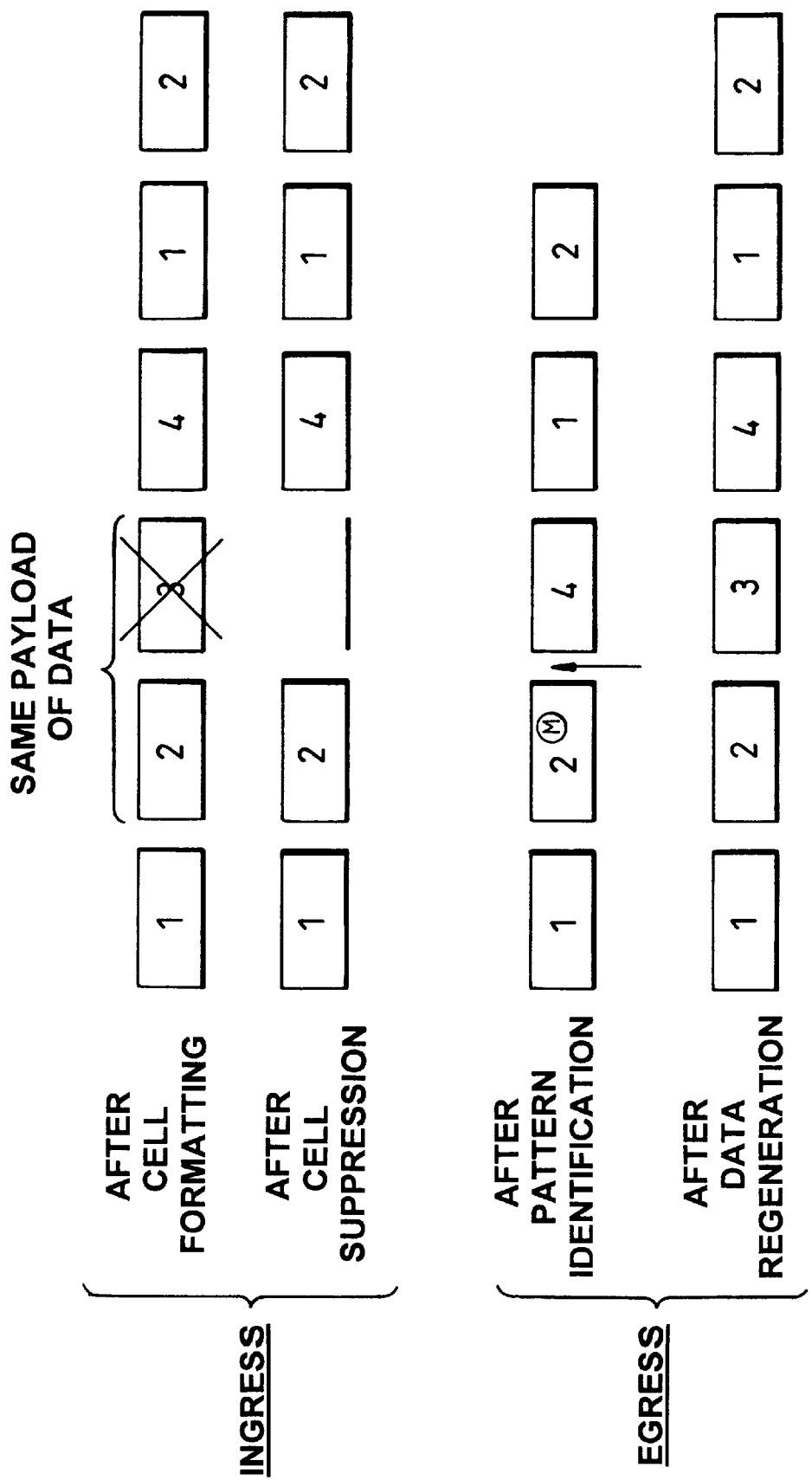
FIG. 7 shows one example of the bandwidth-saving feature.
Figure 8:
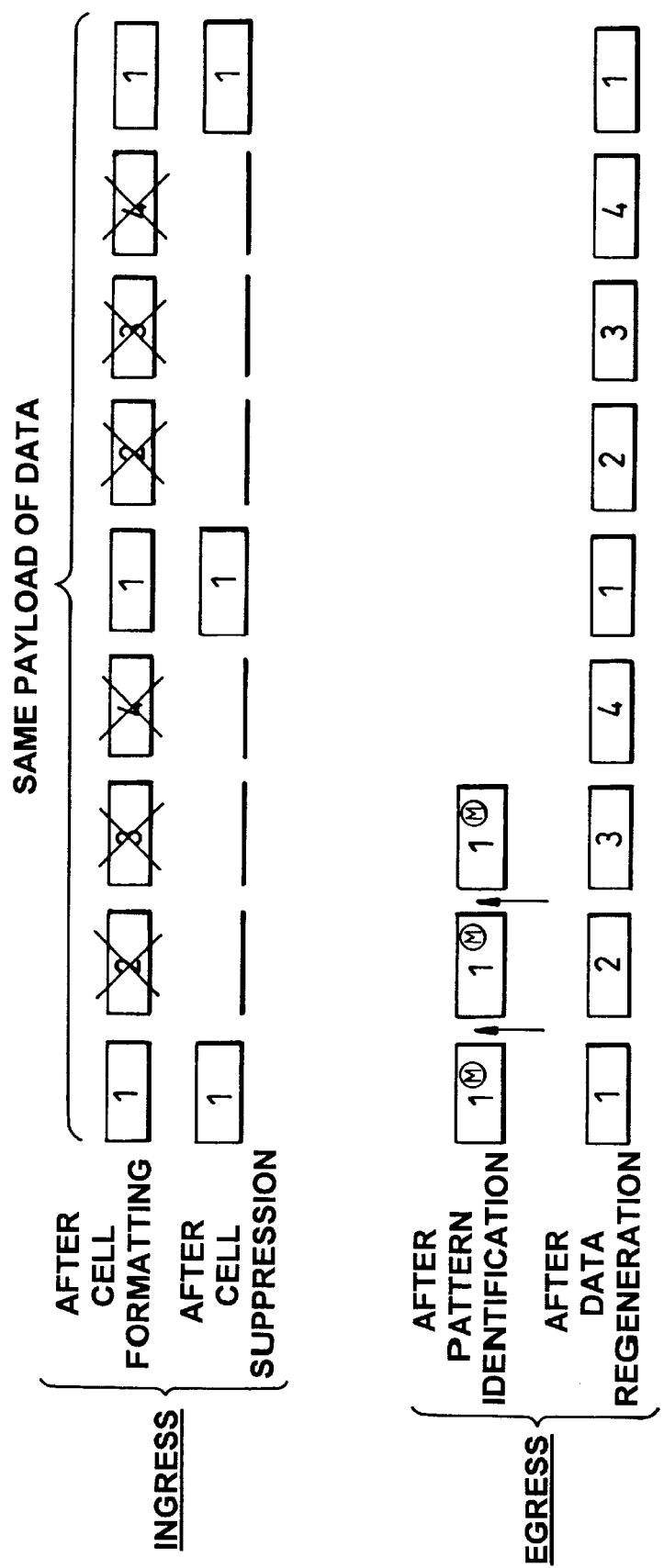
FIG. 8 shows another example of the bandwidth-saving feature.

FIGS. 7 and 8 show two examples of cell suppression and regeneration. For clarity, these examples show a simplified case where there are only four numbers in the list of cell sequence numbers. In FIG. 7, at the ingress the cells having the sequence numbers 2 and 3 contain the same data. The cell having sequence number 2 is transmitted and the cell having sequence number 3 is suppressed, such that the cells having the sequence numbers 1, 2, 4, 1, 2 . . . are transmitted by the ingress and received at the egress. At the egress it is recognised that a cell having sequence number 3 is missing, and that cell together with its payload of data is regenerated.

FIG. 8 shows an example where each cell in a long stream of cells contains the same pattern of data. The first cell, having sequence number 1, is transmitted and the cell having sequence number 2 is suppressed. The ingress cannot suppress all of the following cells (having sequence numbers 3, 4, 1, 2, . . . ) which contain the same data pattern because the egress would not be able to identify all of the missing cells. This would not ensure bit count integrity across the network. Therefore, one cell in every four is sent by the ingress (four being the number of elements in the list of sequence numbers.) Thus, the ingress transmits cells having the sequence numbers 1, 1, 1, 1, . . . The egress can identify that three cells are missing before each received cell having sequence number 1 and correctly regenerate data to ensure bit count integrity. It will be appreciated that this technique can be applied more generally to systems where there are N numbers in the list of sequence numbers, and at least one cell in every N cells are transmitted by the ingress. In the AAL1 protocol N=8.

The above examples show how cells which carry the same payload of data can be suppressed. In the more general case cells having payloads of data which follow a predetermined, or predictable, pattern can be suppressed. To achieve this the ingress looks for data following a predetermined pattern, suppresses redundant cells and the egress regenerates data based on the payload of the received cell preceding the missing cell and a generator which operates using the same rules as used in the ingress pattern matching unit.

Figure 9:
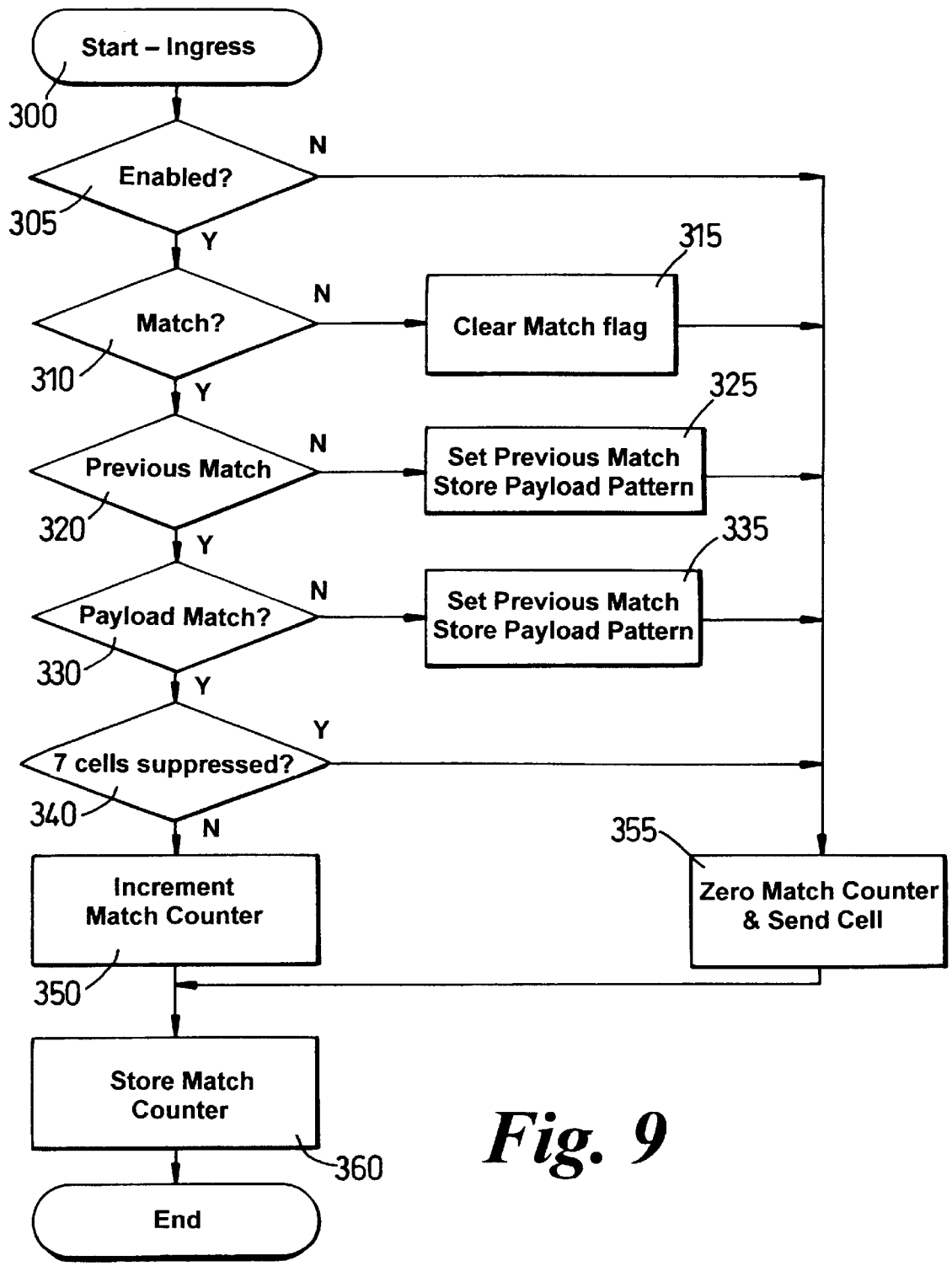
FIG. 9 is a flow-chart to illustrate the suppression algorithm performed at the ingress of the ATM network.

One method of performing suppression at the ingress is now described with reference to FIG. 9. This method identifies cells having identical payloads and where the payload of each cell comprises a set of identical bytes. Firstly, at step 305, a check is made as to whether the suppression feature is enabled. The suppression feature is provisionable on a per-channel basis. At step 310 the payload of a cell is examined to see if all of its bytes are identical. If a cell is only partially filled with user data, it is only the part of the cell carrying user data that is examined. If the bytes are all the same, the method proceeds to step 310 where a check is made as to whether all of the payload bytes of the previous cell were identical. A flag 'Previous Match' indicates whether this is so. If so, the method proceeds to step 330 where a check is made whether the payload of this cell is the same as the previous cell. This is achieved by comparing the Payload Pattern of this cell with the previous one. If this is true, then the current cell matches the previous one identically, and could be suppressed. The last check is to check whether seven consecutive cells have already been suppressed. If less than seven cells have been suppressed, the cell under test is suppressed and a match counter is incremented, to track the number of suppressed cells. The purpose of this last step is to ensure that one cell in every eight is transmitted so that the egress can identify the correct number of missing cells, as explained earlier with reference to FIG. 8.

If the answer to tests 310, 320, 330 are false then the match counter is set to zero and the cell under test is sent.

Figure 10:
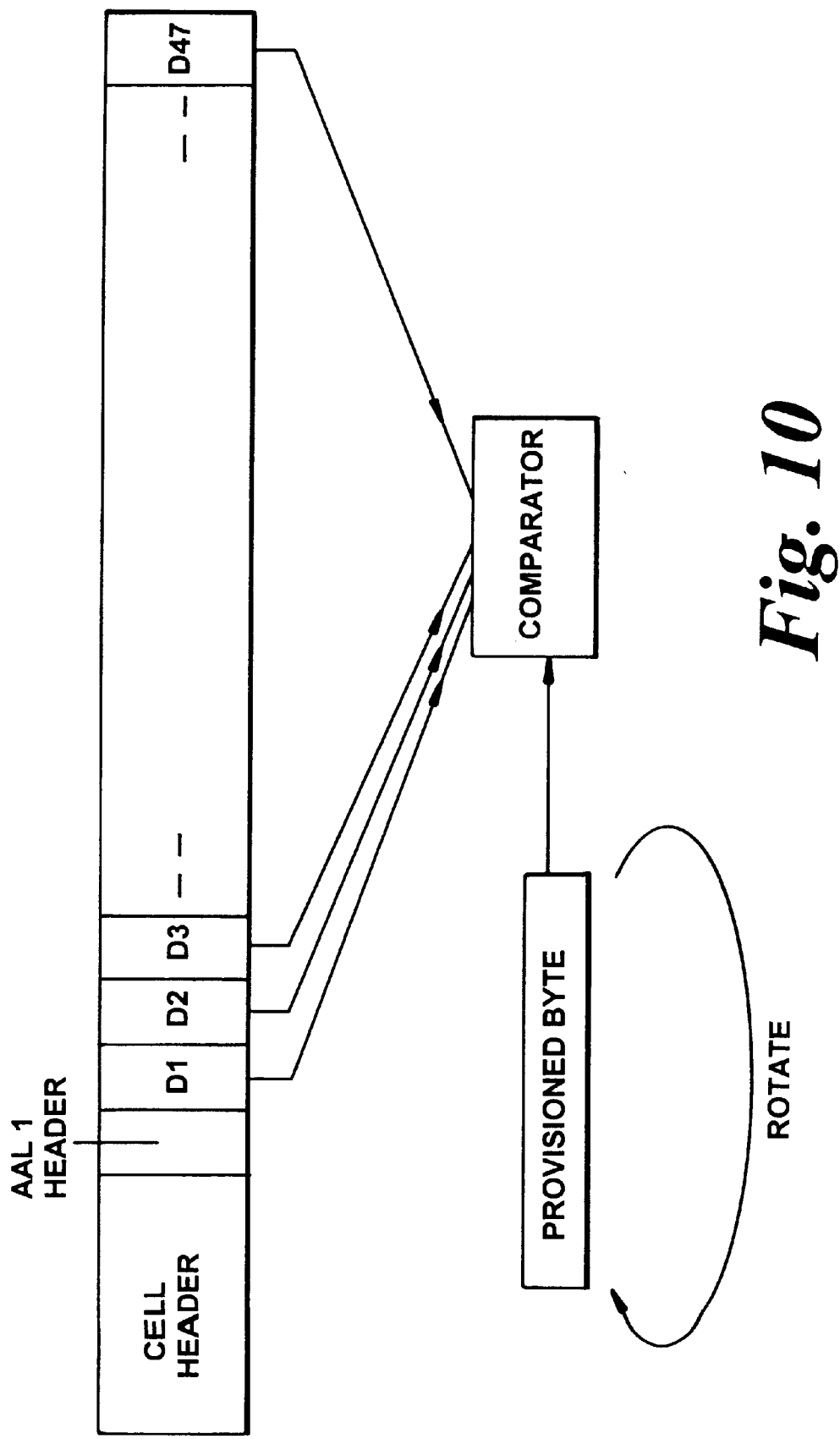
FIG. 10 shows one way of inspecting the payload of a cell.

The primary reason for a source to emit a continuous stream of identical data is an idle condition. In this condition, each byte of a cell will be the same. This may be the HDLC idle flag '01111110' or some rotated version of this flag such as '11001111'. Rotation is caused by incoming data bytes not being aligned with the bytes of the AAL1 cell payload. FIG. 10 shows the process for checking whether all of the bytes in a cell's payload are the same, and equal to a predetermined byte such as an idle flag. The first byte D1 of the payload after the sequence number SN is compared with the idle flag byte in each of its rotated orientations until a match is found. All other payload bytes (D2, D3 . . . D47) are also compared with the provisioned byte in the same orientation.

The method just described looks for cells which contain an identical set of data bytes. The byte could be a commonly occurring byte such as an idle flag which is stored at the ingress for ready comparison with the data, or any other byte which occurs.

In order to maximise bandwidth savings, the ingress and egress should be able to identify a wide range of patterns representative of redundant data in the data carried in cell payloads. Some other patterns will now be described.

Repeating Pattern of N Bytes Within a Cell

The method described above for checking a single byte can be extended to look for repeating patterns of n bytes in length. A set of commonly occurring patterns can be stored in a look-up table at the ingress for ready comparison with the cell data, or the ingress can examine the cell data to look for any repeating data pattern. The egress pattern identification block similarly examines the data in received cells to identify repeating n byte patterns so as to mark the cell.

Repeating Cell Payload

Consecutive cell payloads (not necessarily made up of a set of identical data bytes) can be examined to look for a match. There are two possibilities:

(i) a sequence of consecutive cell payloads match a predetermined stored payload pattern.

The ingress has a look-up table of data payloads that are compared with the incoming data. If a match is found then the ingress sends the first cell and suppresses the subsequent ones. At the egress the received cell payloads are compared with a similar look-up table. When a cell payload matches one of the stored payloads it is marked and if it is followed by a missing cell, the egress knows to replicate the cell payload.

(ii) a sequence of consecutive payloads are identified, but do not match a predetermined stored pattern.

The ingress identifies that there are identical cell payloads and sends the first two cells and suppresses subsequent ones in the sequence. The egress receives two consecutive identical cell payloads followed by one or more missing cells. The egress is programmed to recognise this, and replicates the last received payload. If only one cell were sent, the egress would not be able to identify that there was a pattern in the data and would therefore not regenerate any data for the missing cells.

Pattern Spanning Cell Payloads

For example, two consecutive cells at the ingress contain data which uniformly increases in magnitude (i.e. a data ramp), and the ingress is set to recognise this pattern as redundant data. The first cell is transmitted and the second cell is suppressed. The egress is also set to identify cells which contain data that uniformly increases in magnitude. Upon receiving a cell in which the payload uniformly increases in magnitude followed by one or more missing cells the egress is able to regenerate the missing data by applying the rule of calculating data for the missing cells that uniformly increases in value, continuing on from the data contained in the last received cell.

At the egress, the process of regenerating cells comprises the processes of:

inspecting the data payload of a cell to check whether it contains a pattern of data (e.g. a payload of identical bytes) which indicates that it may be followed by a missing cell; and, looking for missing cell sequence numbers.

The reason for performing both of these processes rather than relying just on identifying missing cell sequence numbers is that cells could be missing for reasons other than cells being purposely suppressed at the ingress; e.g. cells may be misrouted by the ATM network or lost due to faults in the ATM network.

A missing sequence number preceded by a cell having a payload of identical bytes indicates that a cell has been suppressed with a high degree of reliability.

Figure 11:
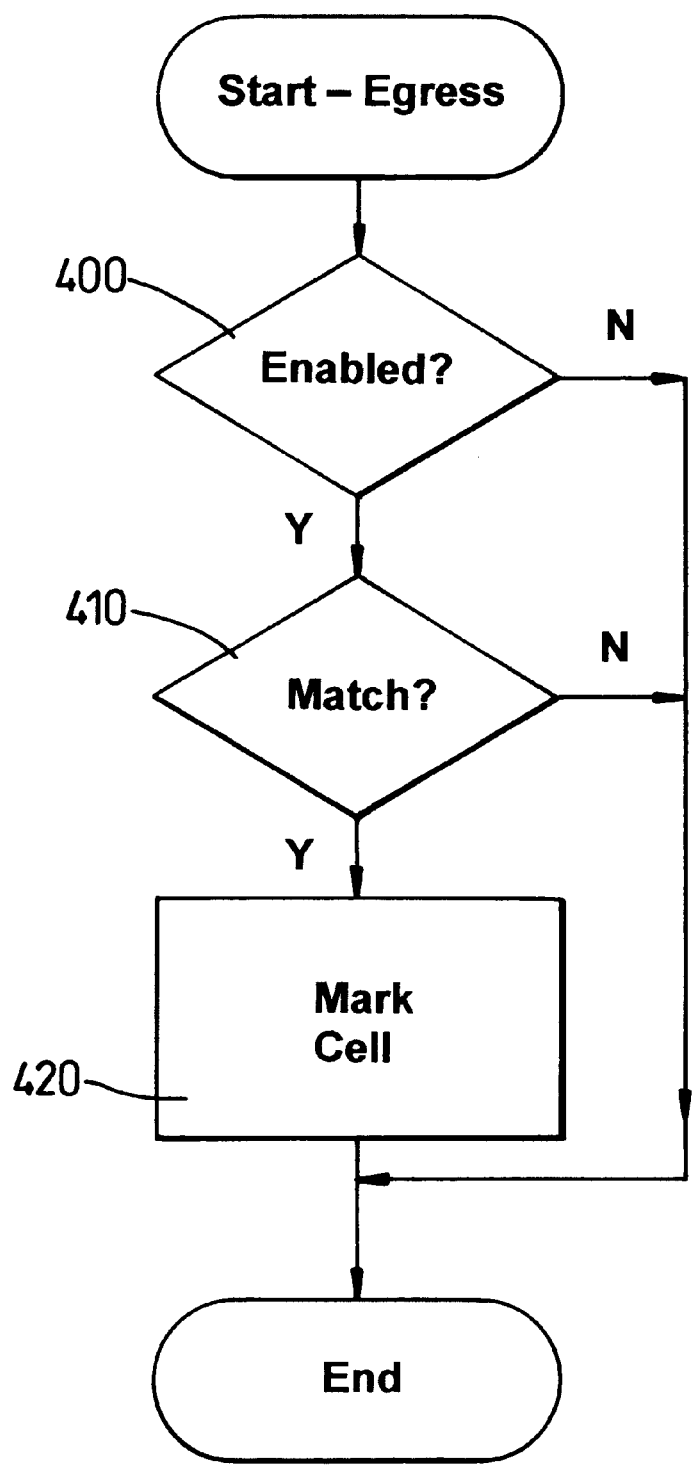
FIG. 11 is a flow-chart to illustrate the marking algorithm performed at the egress of the ATM network.

The method of inspecting a cell payload is shown in FIG. 11. Firstly, at step 400 a decision is made as to whether the suppression/regeneration feature is enabled. If so, at step 410 the payload of the received cell is examined to see if it contains a pattern of data indicating that it may be followed by a missing cell. This can be a test which looks for a payload containing: a set of identical bytes; a repeating pattern of n bytes; a data ramp, or some other data pattern. This step may refer to a look-up table containing commonly-occurring bytes or data patterns and compare these with the payload data.

When a cell is matched, the data regeneration block in AAL1 processor 130 is informed of the data pattern that was matched to allow it to accurately regenerate the data. A cell having a payload of identical bytes is marked.

One way in which a cell can be identified as 'marked' is to use a flag at a predetermined bit position in one of the bytes of the ATM cell header.

The egress pattern identification block 145 may receive information about new data patterns from the ingress or from a network management function using proprietary management communication channels. For example, where the ingress is aware that it is sending, or will be sending, repeated identical payloads of a particular data pattern it can inform the egress of this pattern, thereby allowing the egress to identify this pattern.

Figure 12:
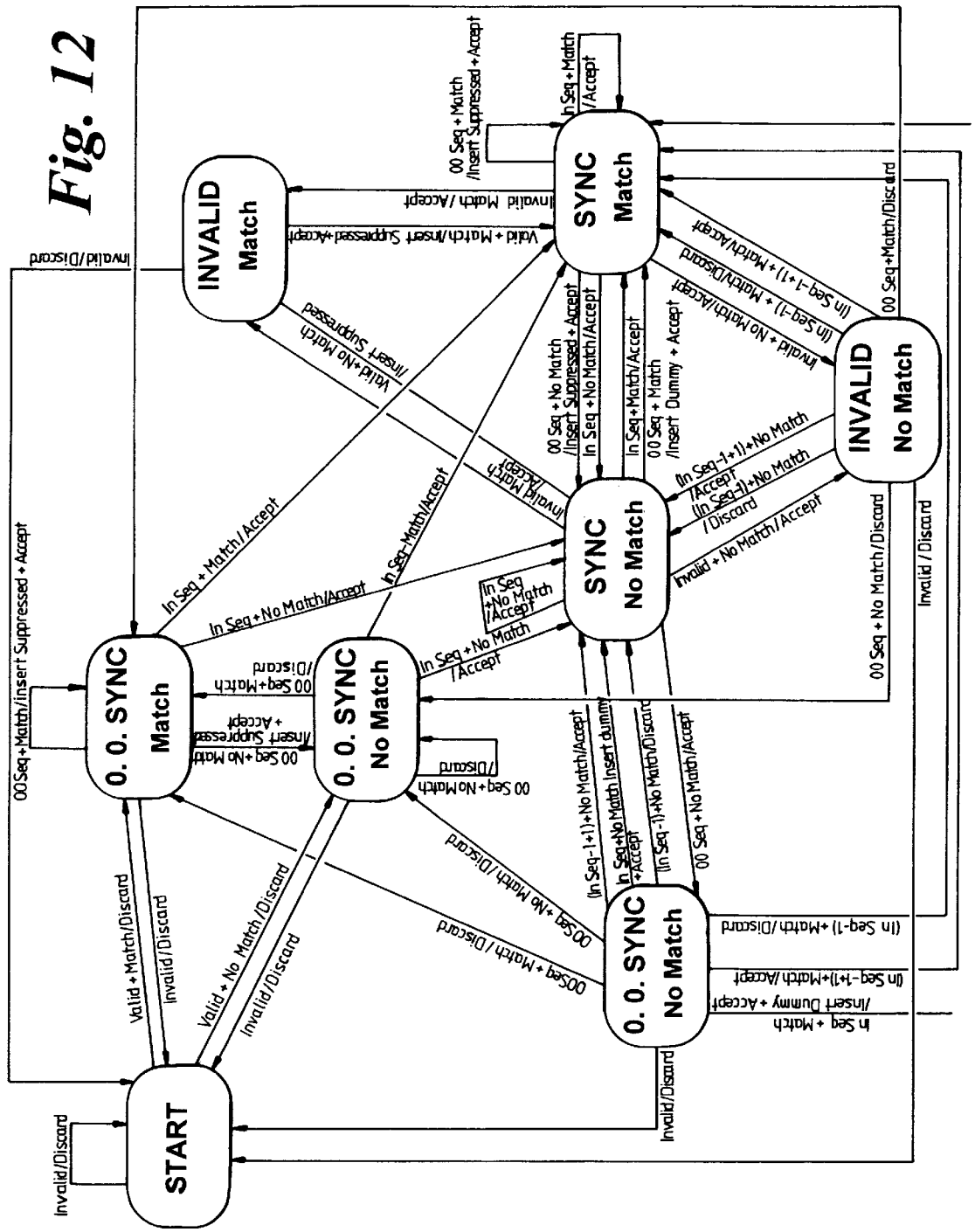
FIG. 12 is a state machine for one way of performing the regeneration algorithm at the egress of the ATM network.

A state machine for processing received cells will now be described with reference to FIG. 12. This state machine is based on the Fast SN algorithm for sequence number processing described in ITU I.363.1 Appendix III. The state machine described in this appendix describes how to deal with events where a cell is lost or misinserted, and in the case where a cell is missing inserts a dummy cell.

A decision in this algorithm is taken immediately after the analysis of the received cell. This means that when a cell is received the SN is immediately evaluated and the cell is eventually passed to the final destination to minimise transmission delay. In the state machine the action always refers to the last cell received.

A valid SN is defined as an SN which has no detected errors or it had an error that was corrected. A Match cell is a cell which has been marked as a match by the ATM interface logic.

When dummy cells are inserted, the payload is the provisioned dummy data byte. When suppressed cells are regenerated the payload is the same as the previously received matched cell.

The following acronyms are used in the algorithm:

SN—Sequence Number including error protection

SC—Sequence Count value

When inserting dummy cells or regenerating suppressed cells the number of cells to be inserted can be calculated from the gap in the sequence number series. For example, receiving cells with the sequence numbers:

1 2 3 7 0
ideally requires 3 cells to be inserted in between the cells having sequence numbers 3 and 7.

The details of the algorithm are the following:

a) Start

It is the initial state. It remains in this state discarding cells until there is a valid SN.

if the cell is Match then goto OUT OF SYNC (Match);
   if the SN is invalid remain in this state;
   otherwise goto OUT OF SYNC (No Match);

b) Out of Sync (No Match)

In this state the sequence counting is not synchronized yet.

if the SC is in sequence with the previous one, it goes to SYNC (No Match) or SYNC (Match) as appropriate; the received cell is accepted;
   if the SC is out of sequence and not a match then remain in this state, discarding the received cell;
   if the SC is out of sequence and a match goto OUT;OF SYNC (Match), discarding the received cell;
   if the SN is invalid return to START, discarding the received cell;

c) Out of Sync (Match)

Again sequence counting is not yet fully synchronized, but because we have had a matched cell we must assume that if an out of sequence cell arrives it is because cells were suppressed at the ingress to the network.

if the SC out of sequence and a match then remain in this state, regenerate suppressed cells and accept received cell;
   if the SC out of sequence and not a match then goto OUT OF SYNC (No Match), regenerate suppressed cells and accept received cell;
   if the SC is in sequence with the previous one then goto SYNC (Match) or SYNC (No Match) as appropriate, accepting the received cell;
   if the SN is invalid then goto START, discarding the received cell;

d) Sync (No Match)

In this state the sequence counting is considered to be synchronized:

if the SC is in sequence with the previous one and the cell is not a match then remain in this state accepting the received cell;
   if the SC is in sequence with the previous one and the cell is a match, goto SYNC (Match) and accept the received cell;
   if the SC is not in sequence with the previous one and the cell is not a match, goto OUT OF SEQUENCE (No Match) accepting the received cell;
   if the SC is not in sequence with the previous one and the cell is a match, goto SYNC (Match) inserting dummy cells and accepting the received cell;
   if the SN is invalid then goto INVALID (Match) or INVALID (No Match) as appropriate, accepting the received cell;

e) Sync (Match)

In this state the sequence counting is considered to be synchronised but we assume that any out of sequence cells are caused by suppression at the ingress to the network.

if the SC is in sequence with the previous one and the cell is not a match, goto SYNC (No Match) accepting the received cell;
   if the SC is in sequence with the previous one and the cell is a match, remain in this state accepting the received cell;
   if the SC is out of sequence with the previous one and the cell is not a match, goto SYNC (No Match) regenerating the suppressed cells and accepting the received cell;
   if the SC is out of sequence with the previous one and the cell is a match, remain in this state regenerating the suppressed cells and accepting the received cell;
   if the SN is invalid goto INVALID (Match) or INVALID (No Match) as appropriate, accepting the received cell; (if the cell was a match cells might have been suppressed but because of the invalid SN it is impossible to know)

f) Out of Sequence (No Match)

In this state the following actions are taken when a cell arrives: NB. there is no OUT OF SEQUENCE (Match) state.

if the SN is invalid, discard the received cell and goto START;
   if the SN is valid and the SC is in sequence with the last cell received with a valid SN, goto SYNC (Match) or SYNC (No Match) as appropriate; the received cell is considered to be misinserted and is discarded to keep bit count integrity because the previous cell is considered to be misinserted but is already sent;
   if the SN is valid and the SC is in sequence with the SC of the previous cell, the system assumes that cells were lost; insert dummy cells, accept the received cell and goto SYNC (Match) or SYNC (No Match) as appropriate;
   if the SC is valid and the SC has a value exceeding by two the SC value of the last cell received in sequence (i.e. the SN error protection mechanism has failed) assume that the received cell was in sequence and therefore accept the received cell and goto SYNC (Match) or SYNC (No Match) as appropriate;
   if the SN is valid but is not in any of the two previous situations, discard the received cell and goto OUT OF SYNC (Match) or OUT OF SYNC (No Match) as appropriate;

g) Invalid (No Match)

In this state the system shall take the following decisions on the received cell:

if the SN is again invalid, goto START and discard the received cell;
   if the SN is valid and the SC is in sequence with the last cell received with a valid SN, goto SYNC (Match) or SYNC (No Match) as appropriate, but discard the received cell to keep bit count integrity because the previous cell is considered to be misinserted but is already sent;
   if the SN is valid and the SC has a value exceeding by two the SC of the last cell received with a valid SN, it is assumed that although there was an invalid SN the received cell is in sequence so therefore accept it and goto SYNC (Match) or SYNC (No Match) as appropriate;
   if the SN is valid but is not in any of the previous situations, discard the received cell and goto OUT OF SYNC (Match) or OUT OF SYNC (No Match) as appropriate;

h) Invalid (Match)

In this state it is assumed that the received cell had a SC which was one more than the previously received cell with a valid SN;

if the SN is again invalid, goto START and discard the received cell;

if the SN is valid, goto SYNC (Match) or SYNC (No Match) as appropriate, inserting regenerated cells if necessary and accepting the received cell.

We claim:

1. A method of reducing bandwidth used on a telecommunications link comprising, at an input to the link, the steps of:

receiving a plurality of data packets, each packet comprising data and a packet identifier;

determining packets which contain redundant data by identifying a sequence of consecutive packets containing data that follows a predictable pattern and transmitting, across the link, only the first packet or packets in the sequence;

and further comprising, at an output of the telecommunications link, the steps of:

receiving the transmitted packets;

determining missing packets according to the identifiers of received packets;

determining whether a missing packet follows one or more packets whose pattern of data indicates the missing packet may purposely have not been transmitted across the link and, if so, generating data for the missing packet, which generated data corresponds to the redundant data not transmitted across the link.

2. A method according to claim 1 wherein identifying a sequence of consecutive packets containing data that follows a predictable pattern comprises identifying a sequence of packets containing same data.

3. A method according to claim 2 further comprising identifying a packet whose data comprises a plurality of identical units.

4. A method according to claim 3 wherein each unit comprises one of: an idle data flag; an alarm flag.

5. A method according to claim 3 wherein each unit comprises a rotated version of one of: an idle data flag; an alarm flag.

6. A method according to claim 1 wherein only a portion of each packet contains user data and the step of determining packets which contain redundant data examines only the portion of the packet containing user data.

7. A method according to claim 1 wherein the packet identifiers of a sequence of packets are a recurring sequence of N symbols, and the input transmits at least one packet in every N packets.

8. A method according to claim 7 wherein the packets are ATM AAL1 cells and the packet identifiers are a sequence of 8 numbers.

9. A method according to claim 1 wherein the packet identifiers of a sequence of packets are a sequence of symbols and the step of determining missing packets according to the identifiers of received packets comprises identifying missing symbols in the sequence of identifiers of received packets.

10. A method according to claim 1 wherein data for the missing packets is generated according to data carried in other packets received at the output.

11. A method according to claim 10 wherein data for the missing packets is generated according to data carried in received packets preceding the missing packets.

12. A method according to claim 11 wherein the input identifies a sequence of packets containing same data and only transmits the first packet in the sequence and the output generates data for the missing packets by replicating data carried in received packets preceding the missing packets.

13. A method according to claim 1 comprising generating data for a missing packet if the missing packet follows a packet whose pattern of data matches a predetermined pattern stored at the egress.

14. A method according to claim 13 further comprising sending pattern information to the egress for use in pattern matching.

15. A method according to claim 1 comprising generating data for a missing packet only if the missing packet follows a packet whose data comprises a plurality of identical units.

16. A method according to claim 1 wherein the packets are ATM cells.

17. A method of operating upon a signal from an output of a telecommunications link on which bandwidth is being reduced by not transmitting packets containing redundant data by identifying, at the input to the link, a sequence of consecutive packets containing data that follows a predictable pattern and transmitting, across the link, only the first packet or packets in the sequence, comprising the steps of:

receiving a plurality of data packets, each packet comprising data and a packet identifier;

determining missing packets according to the identifiers of received packets; and, determining whether a missing packet follows one or more packets whose pattern of data indicates the missing packet may purposely have not been transmitted across the link and, if so, generating data for the missing packet, which generated data corresponds to the redundant data not transmitted across the link.

18. Apparatus for reducing bandwidth used on a telecommunications link comprising, at an input to the link:

means for receiving a plurality of data packets, each packet comprising data and a packet identifier;

means for determining packets which contain redundant data by identifying a sequence of consecutive packets containing data that follows a predictable pattern;

means for transmitting, across the link the first packet or packets in the sequence;

and further comprising, at an output of the communications link:

means for receiving the transmitted packets;

means for determining missing packets according to the identifiers of received packets; and, means for determining whether a missing packet follows one or more packets whose pattern of data indicates the missing packet may purposely have not been transmitted across the link and, if so, for generating data for the missing packet, which generated data corresponds to the redundant data not transmitted across the link.

19. Apparatus for use at an output of a telecommunications link on which bandwidth is being reduced by not transmitting packets containing redundant data by identifying, at the input to the link, a sequence of consecutive packets containing data that follows a predictable pattern and transmitting, across the link, only the first packet or packets in the sequence comprising:

means for receiving a plurality of data packets, each packet comprising data and a packet identifier;

means for determining missing packets according to the identifiers of received packets; and, means for determining whether a missing packet follows one or more packets whose pattern of data indicates the missing packet may purposely have not been transmitted across the link and, if so, for generating data for the missing packet, which generated data corresponds to the redundant data not transmitted across the link.

* * * * *